(12) United States Patent
Dolgin et al.

(10) Patent No.: US 10,243,673 B2
(45) Date of Patent: Mar. 26, 2019

(54) FREQUENCY DEMODULATION SYSTEMS AND METHODS FOR OPTICAL SIGNALS

(71) Applicant: RAYTHEON COMPANY, Waltham, MA (US)

(72) Inventors: Benjamin P. Dolgin, Alexandria, VA (US); Andrew Kowalevicz, Arlington, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/816,670

(22) Filed: Nov. 17, 2017

(65) Prior Publication Data

US 2018/0167145 A1   Jun. 14, 2018

Related U.S. Application Data

(60) Provisional application No. 62/424,023, filed on Nov. 18, 2016.

(51) Int. Cl.
*G02B 5/28* (2006.01)
*G02F 7/00* (2006.01)
*H04B 10/67* (2013.01)

(52) U.S. Cl.
CPC ........... *H04B 10/671* (2013.01); *G02B 5/284* (2013.01); *G02B 5/285* (2013.01); *G02F 7/00* (2013.01); *H04B 10/67* (2013.01)

(58) Field of Classification Search
CPC ........... G02B 5/284; G02B 5/285; G02F 7/00; H04B 10/67; H04B 10/671

(Continued)

(56) References Cited

U.S. PATENT DOCUMENTS 3,936,603 A    2/1976  Guppy et al.
5,371,623 A   12/1994  Eastmond et al.
(Continued)

FOREIGN PATENT DOCUMENTS

| JP | H0591047 A | 4/1993 |
|---|---|---|
| WO | 0195534 A2 | 12/2001 |
| WO | 2016170466 A1 | 10/2016 |

OTHER PUBLICATIONS

Arimoto et al., "High-speed free-space laser communication", Performance and Management of Complex Communications Networks, 1998, pp. 175-190.

(Continued)

*Primary Examiner* — Amritbir K Sandhu
(74) *Attorney, Agent, or Firm* — Lando & Anastasi, LLP

(57) ABSTRACT

Aspects are generally directed to optical signal receivers and methods. In one example, a receiver includes an optical resonator assembly configured to receive an optical signal at each of a plurality of optical resonators, each optical resonator configured to resonate optical signal energy at a corresponding frequency of the received optical signal, each optical resonator being tuned to a different corresponding frequency of the received optical signal, and each optical resonator being configured to output corresponding output optical signal energy. The receiver includes a detector assembly to detect the corresponding output optical signal energy from each optical resonator, and a signal processing circuit configured detect a frequency variation of the received optical signal based on the corresponding output optical signal energy from at least two of the plurality of optical resonators, and configured to generate a digital signal based on the frequency variation.

13 Claims, 7 Drawing Sheets

(58) Field of Classification Search
USPC .......................................... 398/202, 212, 213
See application file for complete search history.

(56) References Cited

U.S. PATENT DOCUMENTS

| | | | | |
|---|---|---|---|---|
| 5,581,575 | A | 12/1996 | Zehavi et al. | |
| 5,684,793 | A | 11/1997 | Kiema et al. | |
| 7,092,641 | B2 * | 8/2006 | Windover | H04B 10/504 372/8 |
| 7,937,000 | B2 * | 5/2011 | Yokoyama | H04B 10/675 398/212 |
| 8,125,644 | B2 * | 2/2012 | Crowe | G01R 33/032 324/244.1 |
| 8,295,712 | B2 | 10/2012 | Chen et al. | |
| 8,394,329 | B2 * | 3/2013 | Jaworski | G01N 21/7746 250/227.14 |
| 8,411,351 | B2 | 4/2013 | McCallion et al. | |
| 9,755,674 | B2 | 9/2017 | Graceffo et al. | |
| 9,900,031 | B2 | 2/2018 | Kowalevicz et al. | |
| 9,973,281 | B2 | 5/2018 | Kowalevicz et al. | |
| 9,989,989 | B2 | 6/2018 | Kowalevicz | |
| 10,050,704 | B1 * | 8/2018 | Yap | H01S 5/0687 |
| 10,164,765 | B2 * | 12/2018 | Dolgin | H04B 10/60 |
| 2003/0012235 | A1 * | 1/2003 | Yokoyama | H01S 5/10 372/25 |
| 2004/0096151 | A1 * | 5/2004 | Svilans | G01J 3/12 385/27 |
| 2006/0013591 | A1 | 1/2006 | Rohde | |
| 2007/0031150 | A1 | 2/2007 | Fisher et al. | |
| 2008/0226300 | A1 * | 9/2008 | Mayer | H04B 10/677 398/158 |
| 2008/0240736 | A1 | 10/2008 | Ji et al. | |
| 2008/0266573 | A1 | 10/2008 | Choi et al. | |
| 2013/0003766 | A1 * | 1/2013 | Savchenkov | G04F 5/14 372/38.01 |
| 2013/0272337 | A1 | 10/2013 | Tan et al. | |
| 2014/0314406 | A1 | 10/2014 | Zerbe et al. | |
| 2015/0260914 | A1 * | 9/2015 | Zheng | G02B 6/126 385/11 |
| 2015/0318982 | A1 | 11/2015 | Kowalevicz et al. | |
| 2015/0319061 | A1 | 11/2015 | Kowalevicz | |
| 2016/0013870 | A1 | 1/2016 | Sorin et al. | |
| 2016/0047677 | A1 * | 2/2016 | Heidrich | G01N 21/7746 356/480 |
| 2018/0054259 | A1 | 2/2018 | Kowalevicz et al. | |
| 2018/0091227 | A1 * | 3/2018 | Dolgin | H04B 10/616 |
| 2018/0091228 | A1 * | 3/2018 | Kowalevicz | G02B 5/28 |
| 2018/0091230 | A1 | 3/2018 | Dolgin et al. | |
| 2018/0091232 | A1 * | 3/2018 | Dolgin | H04B 10/672 |
| 2018/0102853 | A1 * | 4/2018 | Dolgin | H04B 10/612 |
| 2018/0145764 | A1 * | 5/2018 | Dolgin | H04B 10/676 |
| 2018/0145765 | A1 * | 5/2018 | Kowalevicz | H04B 10/676 |
| 2018/0167145 | A1 | 6/2018 | Dolgin et al. | |
| 2018/0205463 | A1 | 7/2018 | Karpov et al. | |
| 2018/0234231 | A1 * | 8/2018 | Dolgin | H04L 7/0075 |

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.

Andrews et al., Final Report: Channel Characterization for Free-Space Optical Communications, Jul. 2012, pp. 1-60. Retrieved from <URL: http://www.dtic.mil/cgi-bin/GetTRDoc?Location=U2&doc=GetTRDoc.pdf&AD=ADA565323> and accessed on Nov. 17, 2017.

Juarez et al., "High-sensitivity DPSK receiver for high-bandwidth free-space optical communication links", Optics Express, vol. 19, May 2011, pp. 1-8.

Fang et al., "Multi-channel Silicon Photonic Receiver Based On Ring-resonators", Optics Express, vol. 18, No. 13, pp. 13510-13515, Jun. 2010.

Xu et al., "Optical Differential-Phase-Shift-Keying Demodulation Using a Silicon Microring Resonator", IEEE Photonics Technology Letters, vol. 21, No. 5, pp. 295-297, Mar. 2009.

Zhang, L. et al. "Microring-based Modulation and Demodulation of DPSK Signal", Optical Society of America, Optics Express, vol. 15, No. 18, Sep. 2007.

* cited by examiner

FREQUENCY DEMODULATION SYSTEMS AND METHODS FOR OPTICAL SIGNALS

CROSS REFERENCE TO RELATED APPLICATION

This application claims priority under 35 U.S.C. § 119(e) to U.S. Provisional Application Ser. No. 62/424,023, titled "FREQUENCY DEMODULATOR/DIGITIZER FOR VARIABLE LIGHT FREQUENCIES/WAVELENGTHS," filed on Nov. 18, 2016, which is hereby incorporated herein by reference in its entirety.

BACKGROUND

Many optical communication systems manipulate light waves to carry information. For instance, often a light source (e.g., a laser source) is modulated to change various properties of emitted light, such as an amplitude, phase, or frequency of the light to convey information. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, from which the underlying signal and the information may be recovered.

Generally, an optical receiver collects a phase-encoded, amplitude-encoded, or frequency-encoded optical signal and performs one or more demodulation processes to convert the phase modulation, amplitude modulation, or frequency modulation into useful information. For example, this information may include communication information encoded in the particular modulation by a transmitter, information encoded in the particular modulation through interaction of the optical signal with an object, or other information about the source of the optical signal, the optical channel through which it traveled, and/or objects with which it interacted.

SUMMARY

Aspects and examples described herein provide apparatuses, systems, and methods for demodulation of weak optical signals without a locally coherent clock source. In particular, certain examples of the systems described herein include an optical signal receiver that converts a received frequency-encoded signal into a digital signal that describes the particular frequency modulation of the received signal. In various examples, the optical signal receiver includes an optical resonator assembly, such as a Fabry-Perot resonator assembly, for converting the received signal into an intensity-encoded optical signal. Specifically, the optical resonator assembly may have a plurality of individual optical resonators the outputs of which are tracked to count one or more frequency variations in the received signal.

When compared to various known receivers, the described apparatuses, systems, and methods increase the detectability of frequency transitions in a received optical signal, among various other benefits. Moreover, the examples of the apparatuses, systems, and methods do not require the use of a local laser reference, analog-to-digital converter, or other complex processing circuitry to translate signal frequency variations into a digital signal. Various other advantages of the described apparatuses, systems, and methods are described herein with reference to the drawings.

According to an aspect, provided is an optical signal receiver. In one example, the optical signal receiver comprises an optical resonator assembly configured to receive an optical signal at each of a plurality of optical resonators, each optical resonator configured to resonate optical signal energy at a corresponding frequency of the received optical signal, each optical resonator being tuned to a different corresponding frequency of the received optical signal relative to the other optical resonators of the plurality of optical resonators, where each optical resonator is further configured to output corresponding output optical signal energy during the resonance thereof, a detector assembly aligned with an output of each of the plurality of optical resonators to detect the corresponding output optical signal energy from each of the plurality of optical resonators, and a signal processing circuit coupled to the detector assembly and configured detect a frequency variation of the received optical signal based on the corresponding output optical signal energy from at least two of the plurality of optical resonators, and configured to generate a digital signal based on the detected frequency variation.

According to various examples, the plurality of optical resonators includes at least a first optical resonator and a second optical resonator, and the signal processing circuit is configured detect the frequency variation of the received optical signal based on an increase in the corresponding output optical signal energy from the first optical resonator and a decrease in the corresponding output optical signal energy from the second optical resonator. In some examples, the signal processing circuit includes a counter, the counter being configured to increase or decrease a count to generate the digital signal based on the frequency variation of the received optical signal. In various examples, the plurality of optical resonators further includes a third optical resonator, the counter being configured to increase the count responsive to the increase in the corresponding output optical signal energy from the first optical resonator and the decrease in the corresponding output optical signal energy from the second optical resonator, and decrease the count responsive to an increase in the corresponding output optical signal energy from the third optical resonator and the decrease in the corresponding output optical signal energy from the second optical resonator.

In various examples, each optical resonator of the plurality of optical resonators has a corresponding optical length, the corresponding optical length of each optical resonator being different than the corresponding optical length of the other optical resonators of the plurality of optical resonators. In some examples, the optical resonator assembly includes a first optical resonator, a second optical resonator, and a third optical resonator, and the optical resonator assembly has a fixed step spacing between the corresponding optical lengths of the first optical resonator and the second optical resonator, and the corresponding optical lengths of the second optical resonator and the third optical resonator.

According to some examples, each optical resonator of the plurality of optical resonators is an etalon having a pair of semi-reflective surfaces configured to at least partially trap the optical signal energy between the pair of semi-reflective surfaces by reflecting a portion of optical signal energy between pair of semi-reflective surfaces. In at least one example, the frequency variation of the received optical signal corresponds to a frequency modulation of the received optical signal.

According to another aspect, provided is a method of detecting information encoded in an optical signal. In one example, the method comprises receiving an optical signal at each of a plurality of optical resonators, within a first optical resonator of the plurality of optical resonators, resonating optical signal energy at a first frequency of the received optical signal, and outputting first output optical signal energy from the first optical resonator during the resonance of the first optical resonator, responsive to a frequency variation of the received optical signal, within a second optical resonator of the plurality of optical resonators, resonating optical signal energy at a second frequency of the received optical signal, and outputting second output optical signal energy from the second optical resonator during the resonance of the second optical resonator, detecting the first output optical signal energy and the second output optical signal energy at a detector assembly aligned with the plurality of optical resonators, detecting the frequency variation of the received optical signal based on the first output optical signal energy and the second output optical signal energy, and generating a digital signal based on the detected frequency variation of the received optical signal.

According to various examples, the method further comprises disrupting the resonance and the first output optical signal energy of the first optical resonator responsive to the frequency variation of the received optical signal. In some examples, detecting the frequency variation of the received optical signal includes detecting the frequency variation based on a decrease in the first output optical signal energy from the first optical resonator and an increase in the second output optical signal energy from the second optical resonator. In various examples, generating the digital signal includes increasing or decreasing a count.

In various examples, the method further comprises responsive to another frequency variation in the received optical signal, within a third optical resonator of the plurality of optical resonators, resonating optical signal energy at a third frequency of the received optical signal, and outputting third output optical signal energy from the third optical resonator, each of the first, second, and third frequency of the received optical signal being different. In some examples, generating the digital signal includes increasing a count responsive to an increase in the first output optical signal energy and a decrease in one of the second output optical signal energy and the third output optical signal energy, and generating the digital signal further includes decreasing the count responsive to an increase in the first output optical signal energy and a decrease in the other of the second output optical signal energy and the third output optical signal energy.

In various examples, resonating optical signal energy within the first optical resonator includes reflecting a portion of the received optical signal energy between a first pair of semi-reflective surfaces, and resonating optical signal energy within the second optical resonator includes reflecting a portion of the received optical signal energy between a second pair of semi-reflective surfaces. In various examples, the frequency variation of the received optical signal corresponds to a frequency modulation of the received optical signal.

According to another aspect, provided is an optical signal receiver. In one example, the optical signal receiver comprises a first optical resonator positioned to receive an optical signal, the first optical resonator being configured to resonate optical signal energy at a first frequency of the received optical signal, and configured to output first output optical signal energy during the resonance of the first optical resonator, a second optical resonator positioned to receive the optical signal, the second optical resonator being configured to resonate optical signal energy at a second frequency of the received optical signal, and configured to output second output optical signal energy during the resonance of the second optical resonator, a third optical resonator positioned to receive the optical signal, the third optical resonator being configured to resonate optical signal energy at a third frequency of the received optical signal, and configured output third output optical signal energy during the resonance of the third optical resonator, where each of the first frequency, second frequency, and third frequency are different. a detector assembly positioned to detect the first output optical signal energy, the second output optical signal energy, and the third output optical signal energy, and a signal processing circuit coupled to the detector assembly and configured detect a frequency variation of the received optical signal based on an increase in the first output optical signal energy, the second output optical signal energy, or the third output optical signal energy, and a decrease in another of the first output optical signal energy, the second output optical signal energy, and the third output optical signal energy.

In various examples, the signal processing circuit is further configured to generate a digital signal based on the detected frequency variation. In some examples, the signal processing circuit includes a counter, the counter being configured to increase or decrease a count to generate the digital signal based on the frequency variation of the received optical signal. In some examples, each of the first optical resonator, the second optical resonator, and the third optical resonator is an etalon having a pair of semi-reflective surfaces.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
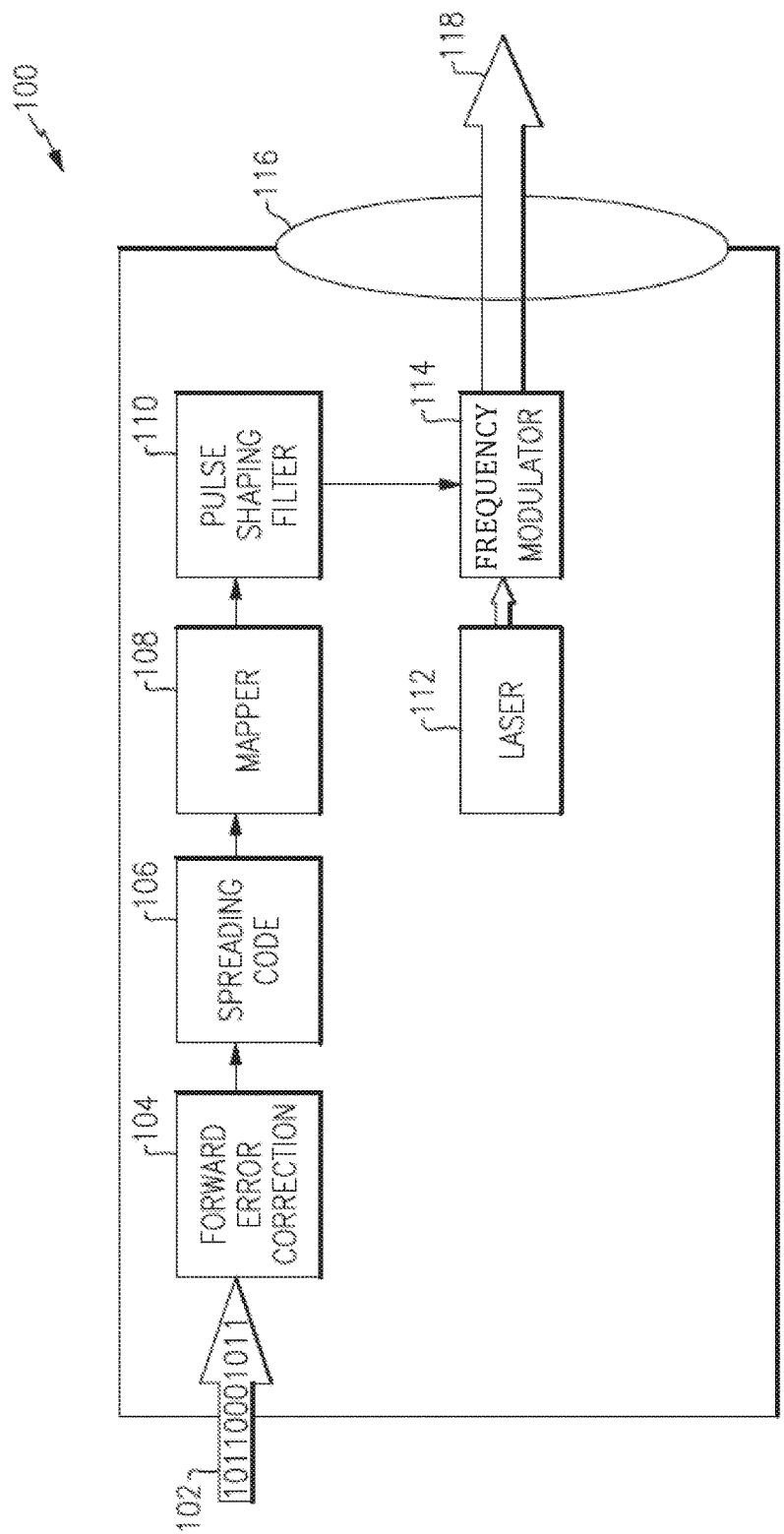
FIG. 1 is a block diagram of an optical transmitter for use with various examples described herein.

Aspects and examples described herein provide optical signal receivers and methods for demodulating frequency-encoded (i.e., frequency-modulated) optical signals without a locally coherent clock source. In certain examples, the described optical signal receivers include an optical resonator assembly that has a plurality of optical resonators each positioned to receive a frequency-modulated optical signal. Each optical resonator of the assembly is tuned to a different corresponding frequency of the received optical signal. In response to receiving a frequency-modulated signal, those optical resonators that are tuned to the frequency of the received signal are configured to convert the frequency-encoded optical signal into output optical signal energy. Since each optical resonator is tuned to a different corresponding frequency, a variation in the received signal (e.g., a variation in frequency) causes another optical resonator to convert the frequency-encoded optical signal into output optical signal energy. Accordingly, the output of each of the plurality of optical resonators may be tracked over time to identify one or more frequency variations in the received optical signal.

Frequency encoded optical signals may come from numerous sources and/or be generated by numerous processes. Detection of a frequency encoding may therefore be useful for many purposes. For instance, a coherent optical signal, such as a laser beam, may be modulated by a data communications transmitter to encode communicated information on an optical signal. However, other types of information, such as timing and/or time stamp information, may also be encoded as a frequency modulation. Various processes frequency modulate a coherent light source, and, accordingly, information about the process may be recovered by appropriate demodulation (e.g., interpreting) of the frequency modulated optical signal. For example, various measurement systems may transmit an optical signal and analyze a reflected signal to determine dimensions, movement, defects, etc.

Some examples of typical frequency modulated signal receivers include local oscillators, Fiber Bragg Gratings, and delay line interferometers. Each of these receivers has significant drawbacks. In particular, these systems typically require components that are complex, large, and/or costly, and often have significant functional limitations. For example, many conventional approaches include a laser positioned within the receiver to convert a frequency modulation to an amplitude modulation. However, these techniques require a highly stable laser having a narrow-line width. Another typical approach uses a FBG to convert the frequency modulation to amplitude modulation, which requires an optical circulator element, thereby increasing the complexity, size, and cost. A further conventional approach uses a Mach-Zehnder delay line interferometer and is limited to a single communication data rate.

Examples of various systems for which demodulation of frequency modulated optical signals may be beneficial include target designators, laser guidance systems, laser sight, laser scanners, 3D scanners, homing beacons and/or surveying systems, as well as communication systems. In at least some of these examples, an optical signal may arrive via a free space signal path (e.g., free space optical, FSO), a fiber coupling, or another waveguide system. Systems and method for demodulation of frequency modulated optical signals in accord with aspects and examples disclosed herein may be beneficially applied to any of the above example optical systems, or others, to receive, detect, recover, etc. useful information from an optical signal having frequency encoding.

It is to be appreciated that embodiments of the apparatuses, methods, and systems discussed herein are not limited in application to the details of construction and the arrangement of components set forth in the following description or illustrated in the accompanying drawings. The apparatuses, methods, and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics, to name a few examples.

Many optical receivers (e.g., coherent receivers) require a stable clock in order to accurately perform demodulation processes for a received signal, and may also require sophisticated optics, especially when modulation includes encoding of information in polarization of the optical signal. In contrast, optical receivers (also referred to as "optical signal receivers") in accord with the aspects and examples disclosed herein do not require a local coherent clock source and do not require significant optical components to achieve the same receiver capabilities as a conventional optical receiver. The benefits are achieved, at least in part, by an optical front-end that includes an optical resonator assembly capable of detecting modulation transitions, such as frequency variations, in a received optical signal without a coherent reference source. The optical resonator assembly further transforms the modulation, e.g., frequency modulation, into an intensity modulation that allows simplified processing, potentially in the electrical domain. In particular, optical signal receivers in accord with aspects and examples disclosed herein may transform frequency variations in a received signal into a digital signal without the use of an analog-to-digital converter.

Figure 2:
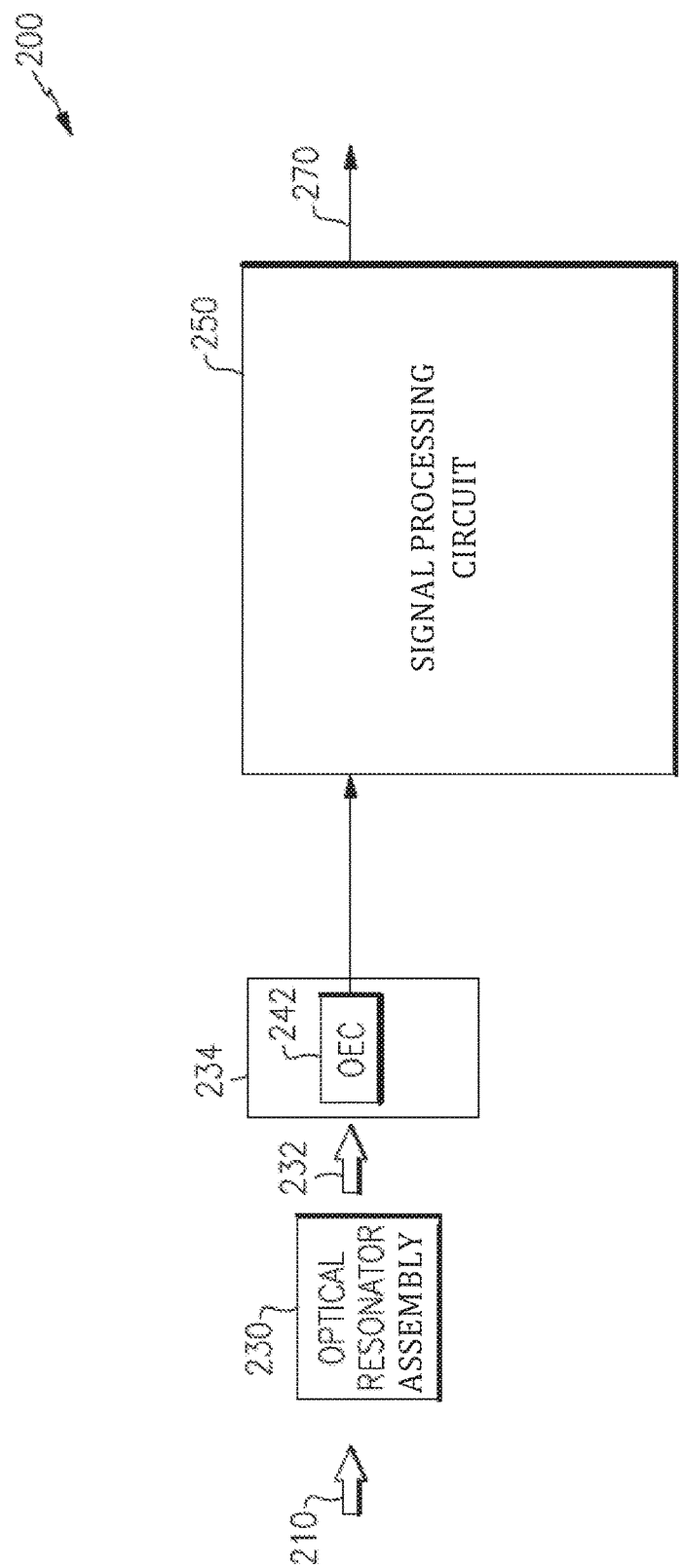
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical signal receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 (also referred to herein as "optical signal transmitter" 100) shown in FIG. 1 and the optical receiver 200 (also referred to herein as "optical signal receiver" 200) shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., pre-defined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a detector, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, a forward error correction (FEC) module 104, a spreading module 106, a mapping module 108, a pulse-shaping filter 110, an optical source (e.g., a laser) 112, a modulator 114 (e.g., frequency modulator), one or more optics 116, and an output 118 to provide an optical signal output. In the optical transmitter 100, the FEC module 104 implements forward error correction by adding redundancy to the received data payload with a block code or convolution code. For example, the FEC module 104 may repeat one or more bits within the data payload to reduce an effect that the transmission medium may have on the transmitted signal waveform. Accordingly, in various examples the optical transmitter 100 may include a FEC module 104 to control errors that may result from transmitting the data payload through a noisy or lossy medium. Following the FEC module 104, the data payload is provided to the spreading module 106.

The transmitter 100 includes a spreading module 106 that applies a spreading code to the data payload. The spreading code is useful for identifying and processing signal components in the receiver, and may reduce the effects of inter-symbol interference (ISI). For example, the spreading module 106 may include a pseudo-random code generator (PRCG) and may apply direct sequence spread spectrum (DSSS) techniques, while other examples of transmitters or spreading modules may apply other forms of spreading. The mapping module 108 receives the data payload from the spreading module 106 and maps the data payload to a particular modulation scheme. For instance, the mapping module 108 may map the data payload to various positions of a particular constellation, depending upon the types of modulation used by the transmitter, e.g., frequency, phase, amplitude or any combination of these.

A pulse-shaping filter 110 may receive an output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in frequency, phase, and/or amplitude) for each symbol of the data payload to encode those symbols on the carrier waveform. In various examples, the modulator is a frequency modulator that is configured to change the frequency of the transmitted beam as a function of, or proportional to, each symbol of the data payload. The transmitter 100 may also include one or more optics 116, such as one or more mirrors or lenses, which direct the optical signal at the output 118. Specifically, the one or more optics 116 may be used to direct the optical signal in a direction of an optical receiver (e.g., the optical receiver 200 illustrated in FIG. 2).

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. For instance, the optical receiver 200 may receive an optical signal transmitted along a free space signal path (e.g., free space optical, FSO), a fiber coupling, or another waveguide system by the optical transmitter 100 of FIG. 1. In various examples, the optical receiver 200 may be paired together with the optical transmitter 100 to form a bidirectional data communication system (e.g., a transceiver). The transceiver may be capable of bidirectional data communication with another transmitter/receiver pair.

As illustrated in FIG. 2, the optical receiver includes an optical resonator assembly 230, a detector assembly 234 including at least one optical-electrical converter (OEC) 242, and a signal processing circuit 250. As discussed herein, the detector assembly 234 and the signal processing circuit 250 may be collectively referred to as a detector. However, in various other examples, the detector assembly 234 and signal processing circuit 250 may be separate components. The optical resonator assembly 230 is positioned to receive an optical signal 210. The optical resonator assembly 230 may be coupled to the signal processing circuit 250 by the detector assembly 234 (e.g., via the at least one OEC 242), for example. The signal processing circuit 250 is configured to provide an output 270 to one or more downstream components based on the received optical signal 210 and/or one or more characteristics of the received optical signal 210.

In various examples, the optical resonator assembly 230 includes a plurality of individual optical resonators. Examples of optical resonators may include Fabry-Perot etalons, micro-rings, or other types of resonators. An optical resonator is a component capable of sensing variations, such as frequency variations, amplitude variations, or phase variations in the received optical signal 210. In various examples, the optical resonator assembly 230 may be coupled to a pump source (not shown), which may excite one or more components (e.g., an active optical medium) of the plurality of optical resonators to generate an optical gain in the received optical signal 210. In various examples, variations in the received optical signal 210 are representative of a modulation performed at the transmitter. That is, the one or more variations may be representative of information encoded on the optical signal 210.

As further described below with reference to at least FIG. 3, each optical resonator of the optical resonator assembly 230 is configured to resonate optical signal energy and provide output optical signal energy 232 when the received optical signal 210 has a frequency corresponding to one or more characteristic frequencies (e.g., characteristic resonant frequencies) of that particular optical resonator. In some examples, each optical resonator may transmit output optical signal energy, and in other examples each optical resonator may reflect output optical signal energy. When a deviation from that frequency occurs (e.g., as a result of a frequency variation), the optical signal energy resonance is disrupted, along with the corresponding output optical signal energy 232.

In various examples, each optical resonator within the optical resonator assembly 230 may have one or more characteristic resonant frequencies (in some instances herein also referred to as a characteristic resonant wavelength), each associated with a certain frequency of light. When the frequency of an arriving optical signal 210 is aligned with the characteristic resonant frequency of an optical resonator, optical signal energy accumulates or adds to build-up resonating optical signal energy inside that optical resonator, and output optical signal energy 232 is output (e.g., transmitted and/or reflected) from that optical resonator. A characteristic resonant frequency of an optical resonator may be based upon an optical length of that respective optical resonator. As further described herein, optical length may refer to the time it takes light to travel between two points (e.g., the reflective surfaces of an etalon), divided by the speed of light in a vacuum. In most cases, optical length is about equal to the product of the physical length and an index of refraction of a medium.

In various examples, each optical resonator of the assembly 230 may have a different optical length, and accordingly, a different characteristic resonant frequency. As such, when the arriving optical signal 210 is allowed into each optical resonator of the optical resonator assembly 230, those optical resonators tuned to the frequency of the received optical signal 210 will output optical signal energy 232 of a higher intensity (e.g., amplitude) relative to those optical resonators that are not tuned to the frequency of the received optical signal 210. However, when a variation in the frequency of the arriving signal 210 occurs (e.g., a deviation from that initial frequency), those optical resonators tuned (e.g., frequency aligned) to the new frequency of the received optical signal 210 will exhibit an increase in output optical signal energy 232 intensity, and those optical resonators that are no longer tuned to the frequency will exhibit a decrease in output optical signal energy 232 intensity.

Accordingly, a variation in frequency of the arriving optical signal 210 may cause a change in the intensity of the emerging output optical signal energy 232 of each optical resonator of the optical resonator assembly 230. While described primarily in the context of etalons, similar operations occur in a micro-ring or other optical resonator. Accordingly, in various examples, the optical resonator assembly 230 functions as a demodulator, or a modulation converter, for a received optical signal (e.g., optical signal 210). In particular, variations in the output optical signal energy 232 from across the plurality of optical resonators may carry the same information content as an arriving frequency modulated optical signal (e.g., optical signal 210), but in intensity modulated form.

In various examples, the output optical signal energy 232 is directed to the detector assembly 234, which may include one or more OECs 242. Specifically, the detector assembly 234 may include one OEC 242 for each optical resonator of the optical resonator assembly 230. The OECs 242 convert the emerging output optical signal energy 232 into an electrical signal. For example, each OEC 242 may include a photodetector, such as a photodiode. Accordingly, the OECs 242 may produce amplitude modulated signals representative of the output optical signal energy 232. The amplitude modulated signals representative of the output optical signal energy 232 may be converted to a digital form by the signal processing circuit 250, which may include various hardware or software components. As further described herein, in various examples, the output optical signal energy 232 may be converted to a digital form without the use of traditional analog-to-digital converters. The digital signal may then be provided to other components of the signal processing circuit 250 for digital processing. For instance, the signal processing circuit 250 may process the digital signal to receive the information-carrying content of the optical signal 210. The basic operation of the signal processing circuit 250 to receive the information-carrying content of the optical signal 210 from the output optical signal energy 232 is further described below with reference to at least FIGS. 3-6.

In various examples, a receiver in accord with aspects and examples disclosed herein may include additional or fewer components than discussed above, and may omit or add various components relative to those discussed above. For example, focusing optics may be included to receive the emerging output optical signal energy 232 from the optical resonator assembly 230 and to focus the output optical signal energy 232 on the OECs 242 of the detector assembly 234. In certain examples, the receiver 200 may also include one or more optics (now shown) that collect and direct the optical signal 210 to the optical resonator assembly 230.

Figure 3:
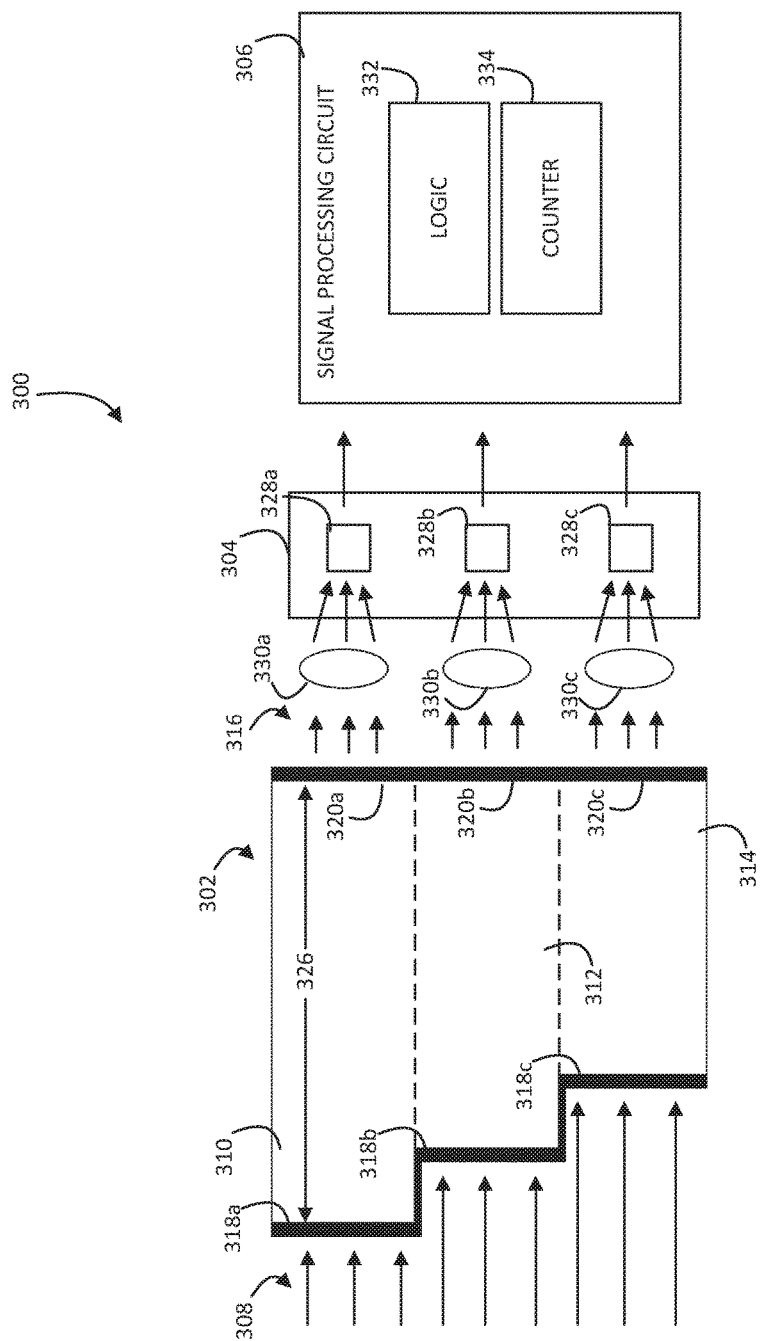
FIG. 3 illustrates an optical receiver according to various examples described herein.

Referring to FIG. 3, there is illustrated an example of an optical signal receiver 300 that includes an optical resonator assembly 302, a detector assembly 304, and a signal processing circuit 306. For instance, the optical resonator assembly 302, the detector assembly 304, and the signal processing circuit 306 may be the optical resonator assembly 230, the detector assembly 234, and the signal processing circuit 250, respectively, shown in FIG. 2. The optical resonator assembly 302 is a multi-aperture device including a plurality of co-aligned optical resonators (e.g., shown as first optical resonator 310, second optical resonator 312, and third optical resonator 314). Each optical resonator 310, 312, 314 has a corresponding aperture that is positioned to receive an optical signal 308 and direct that optical signal 308 along a length of the corresponding optical resonator 310, 312, 314.

In particular, FIG. 3 depicts each optical resonator 310, 312, 314 as an etalon. However, in other examples, the etalons may be replaced with micro-rings, or other resonant structures. A micro-ring is a resonator formed of one or more waveguides. One or more of the waveguides is a closed loop arranged such that optical signal energy traversing "around" the loop may be aligned with a dimension of the loop at one or more frequencies. Accordingly, optical signal energy traversing the loop may interact with itself, at certain frequencies, to sustain the optical signal energy within the loop. At other frequencies, optical signal energy traversing the loop will destructively interfere with itself thereby destroying, or rejecting, a build-up of optical signal energy at that frequency. The closed loop is also coupled to an input to allow light to enter the loop, e.g., an aperture, and an output to let light out of the loop. Accordingly, examples of the optical resonators 310, 312, 314 described herein are not limited to the arrangement illustrated in FIG. 3.

Each optical resonator 310, 312, 314 is capable of converting a modulation of the received optical signal 308 to an intensity variation in output optical signal energy 316 either by interaction of the arriving optical signal 308 with resonant optical signal energy accumulated within that optical resonator or by changing a transfer function as a function of frequency of light. As illustrated, each optical resonator 310, 312, 314 may include a pair of parallel semi-reflective surfaces with an at least semi-transparent medium interposed there between. In FIG. 3, each of the optical resonators 310, 312, 314 is shown as having a first semi-reflective surface 318a, 318b, 318c and a second semi-reflective surface 320a, 320b, 320c. Each of the second semi-reflective surfaces 320a, 320b, 320c is aligned relative to the second semi-reflective surfaces 320a, 320b, 320c of the other optical resonators 310, 312, 314. The two semi-reflective surfaces of each optical resonator 310, 312, 314 are configured to at least partially trap optical signal energy inside the corresponding optical resonator by reflecting a portion of optical signal energy impinging upon each of the semi-reflective surfaces. In some examples, the surfaces 318a, 318b, 318c, 320a, 320b, 320c are semi-reflective and also semi-transmissive, in that they allow some light through. That is, some of the resonating optical signal energy inside each optical resonator 310, 312, 314 is emitted through one of the semi-reflective surfaces 318a, 318b, 318c, 320a, 320b, 320c (referred to as the "output optical signal energy"). The output optical signal energy 316 emitted from each of the optical resonators 310, 312, 314 is shown collectively, for example, as the optical signal energy 316 in FIG. 3.

Accordingly, one of the first semi-reflective surface 318a, 318b, 318c and the second semi-reflective surface 320a, 320b, 320c of each optical resonator 310, 312, 314 may form an entrance aperture (shown as the first semi-reflective surfaces 318a, 318b, 318c in FIG. 3) through which the arriving optical signal 310 is received and directed into the inside of the respective optical resonator 310, 312, 314. The other of the first semi-reflective surfaces 318a, 318b, 318c and the second semi-reflective surfaces 320a, 320b, 320c (shown as second the semi-reflective surfaces 320a, 320b, 320c in FIG. 3) forms an optical output from which the output optical signal energy 316 is emitted. That is, the second semi-reflective surfaces 320a, 320b, 320c allow a portion of trapped resonating optical signal energy from the interior to emerge as the output optical signal energy 316. Accordingly, the second semi-reflective surfaces 320a, 320b, 320c are also semi-transmissive, such that optical signal energy arriving at the second semi-reflective surfaces 320a, 320b, 320c is partially reflected back to the interior and partially transmitted or reflected through the output.

The optical resonators 310, 312, 314 may have varying levels of reflectivity and transitivity of the semi-reflective surfaces 318a, 318b, 318c, 320a, 320b, 320c. In certain examples, the reflectivity may be expressed as a fraction of light amplitude reflected back into the optical resonator 310, 312, 314 (e.g., in the interior of the optical resonator 310, 312, 314), or may be expressed as a fraction of light intensity reflected back into the optical resonators 310, 312, 314 (e.g., into the interior of the optical resonators 310, 312, 314). In a particular example, an amplitude reflectivity of the first semi-reflective surfaces 318a, 318b, 318c may be $r_1=0.999$ and an amplitude reflectivity of the second semi-reflective surfaces 320a, 320b, 320c may be $r_2=0.985$. In other examples the reflectivity of each of the first and second semi-reflective surfaces 318a, 318b, 318c, 320a, 320b, 320c may be different, and may be any suitable value for a particular implementation.

The use of the term "etalon" throughout this disclosure is not intended to be limiting and as used herein may include any of multiple structures, including plates with reflecting surfaces as well as parallel mirrors with various materials positioned in-between, and in particular examples, with active optical materials positioned in-between. The spacing between the first semi-reflective surfaces 318a, 318b, 318c and the second semi-reflective surfaces 320a, 320b, 320c of the optical resonators 310, 312, 314 may be referred to herein as a cavity, but is not so limited. That is the optical resonators 310, 312, 314 may include other structures, such interferometers and the like. Additionally, etalon structures may be formed as a laminate, layer, film, coating, or the like.

In some examples, an optical resonator (e.g., an etalon) may include reflective surfaces (including semi-reflective surfaces) that are not co-planar and/or are not co-linear. For example, an interior reflective surface of an optical resonator may include some curvature, and an opposing surface may also be curved such that a distance between the two surfaces is substantially constant across various regions of the optical resonator, in some examples. In other examples, an optical resonator may have non-linear or non-planar surfaces with varying distances between the surfaces at various regions, and may still function as an optical resonator for various frequencies and at various regions, suitable for use in examples discussed herein. Accordingly, an optical resonator may be purposefully designed to conform to a surface, or to have various regions responsive to differing frequencies, or responsive to differing angles of arrival for a given frequency, in certain examples.

The optical signal 308 received by each of the plurality of optical resonators 310, 312, 314 may establish a steady-state energy-preserving condition in one or more of the optical resonators 310, 312, 314. In particular, when a frequency of the received optical signal 308 corresponds to a characteristic resonant frequency of an optical resonator, the optical signal 308 may accumulate or add to build-up resonating optical signal energy within that optical resonator, and may emerge from that optical resonator at a constant rate (i.e., a steady-state output value). A variation in the frequency of the arriving optical signal 308 disrupts the optical signal energy resonating inside that optical resonator, and, accordingly, disturbs the output optical signal energy 316. Specifically, the optical resonator causes the received optical signal 308 to resonantly interact with itself, internal to the optical resonator, such that frequency changes in the received optical signal 308 disrupts the resonance of optical signal energy within the optical resonator and cause amplitude (or intensity) variations in the output optical signal energy 316. In various examples, output optical signal energy 316 from one or more of the optical resonators 310, 312, 314 may appear as an intensity pulse when that optical resonator 310, 312, 314 is tuned to the frequency of the received optical signal 308.

According to certain examples, a first optical resonator (e.g., first optical resonator 310) of the optical resonator assembly 302 has at least one dimension having a first value selected to allow the first optical resonator 310 to accumulate the resonant optical signal energy inside the first optical resonator 310. In particular, the first optical resonator 310 may have one or more characteristic resonant frequencies, each associated with a certain frequency of light, based upon the spacing (i.e., optical length) between the semi-reflective surfaces 318a, 320a of that optical resonator 310. In FIG. 3, the optical length of the first optical resonator 310 is represented by the distance 326 between first reflective surface 318a and second reflective surface 320a. In this regard, when the frequency of the received optical signal 308 is aligned (e.g., tuned) with the characteristic resonant frequency of the first optical resonator 310, the optical signal accumulates or adds to build-up resonating optical signal energy inside the first optical resonator 310, and emerges from the first optical resonator 310 at a constant rate.

In various examples, the other optical resonators (e.g., optical resonators 312, 314) may have one or more different characteristic resonant frequencies, each associated with a different frequency of light. Specifically, the spacing (i.e., optical length) between the semi-reflective surfaces of each optical resonator 310, 312, 314 may be different from those of the other optical resonators. For instance, a difference in optical lengths between each of the optical resonators 310, 312, 314 may be a multiple of:

$$\frac{\lambda}{2m}$$

where "λ" is the wavelength of light, and "m" is the total number of optical resonators within the optical resonator assembly 302. In this manner, there may be a fixed step spacing between each adjacent optical resonator of the optical resonator assembly 302.

Referring to FIG. 3, a difference in optical length between the first optical resonator 310 and the second optical resonator 312 is (λ/2(m+1)), and a difference in optical length between the second optical resonator 312 and the third optical resonator 314 is also (λ/2(m+1)). Accordingly, a total difference in optical length between the first optical resonator 310 and the third optical resonator 314 is slightly less than λ/2. In particular embodiments, a total difference in optical length between the first optical resonator 310 and a last optical resonator (e.g., optical resonator 314 shown in FIG. 3) of the optical resonator assembly 302 is approximately:

$$\frac{m-1}{m} \cdot \frac{\lambda}{2}.$$

While in the illustrated example the difference in optical length between each adjacent optical resonator is the same or approximately the same (e.g., a fixed step), in various other examples, the difference in optical length between each adjacent optical resonator may be different. For instance, the difference in optical length may have a tolerance range of 10%-20% of λ/2 m. That is, the total difference in optical lengths between the shortest optical resonator and the longest optical resonator may be within 20% of:

$$\frac{m-1}{m} \cdot \frac{\lambda}{2},$$

and the difference between the optical lengths of adjacent optical resonators may be within 20% of:

$$\frac{\lambda}{2m}.$$

In certain examples, such dimensional scales are much shorter than the length of a transmitted symbol, which is the distance traveled by the optical signal between transitions that convey information.

Accordingly, the arriving optical signal may achieve resonance in only one of the plurality of optical resonators 310, 312, 314 until a frequency variation in the optical signal 308 occurs. While various examples are generally described herein with reference to an increase in frequency, a decrease in frequency, an increasing frequency, a decreasing frequency, a characteristic resonant frequency, and/or a variation in frequency, it is appreciated that frequency generally has an inverse relationship to wavelength. For instance, in the case of light moving through a vacuum, frequency is equal to the speed of light in the vacuum divided by wavelength. For a nondispersive media, this expression becomes v/λ, where "v" is the phase velocity of the light wave. Accordingly, various other examples may be described with reference to wavelength instead of frequency. For instance, the examples of the systems, optical signal receivers, and optical resonator assemblies described herein may be described as responding to an increase in wavelength, a decrease in wavelength, an increasing wavelength, a decreasing wavelength, and/or a variation in wavelength. In these examples, the optical resonators 310, 312, 314 may be characterized as each having a corresponding characteristic resonant wavelength instead of a corresponding characteristic resonant frequency.

When a frequency variation occurs, the optical signal resonance and output optical signal energy 316 of that optical resonator may be disrupted, and the optical signal may accumulate or add to build-up resonating optical signal energy inside another of the optical resonators 310, 312, 314. For example, in response to continuously receiving an optical signal 308 at a first frequency, the optical signal 308 may accumulate or add to build-up resonating optical signal energy inside the first optical resonator 310. During the resonance thereof, the first optical resonator 310 may provide (e.g., transmit or reflect) output optical signal energy 316. In response to a frequency variation in the optical signal 308, the optical resonance and transmission of the first optical resonator 310 may be disrupted, and the optical signal 308 may accumulate or add to build-up resonating optical signal energy inside the second optical resonator 312. During the resonance of the second optical resonator 312, the second optical resonator 312 may provide (e.g., transmit and/or reflect) output optical signal energy 316. In various examples, the disruption in output optical signal energy 316 may manifest as an intensity decrease in output optical signal energy 316, and the build-up of resonating optical signal energy may manifest as an intensity decrease in output optical signal energy 316.

Figure 4:
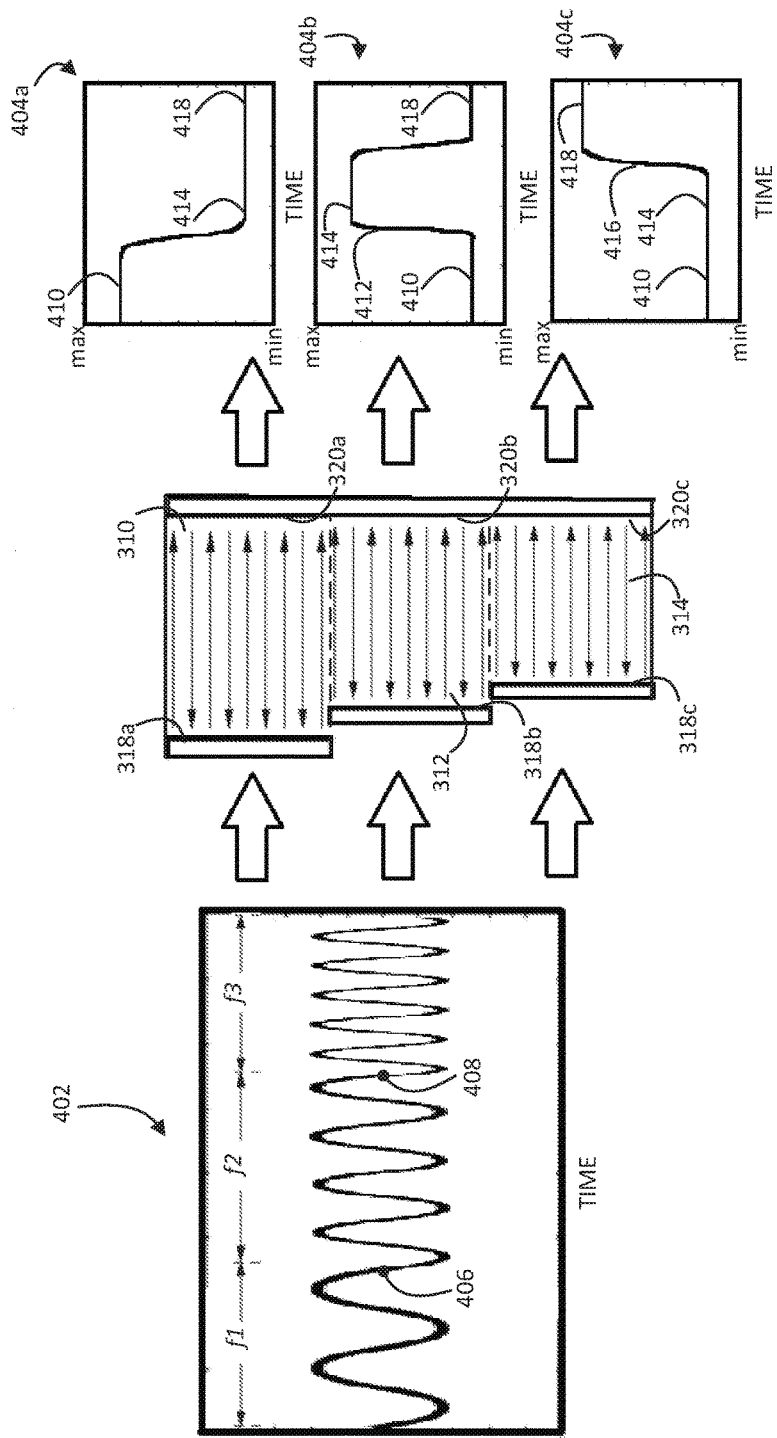
FIG. 4 is a diagram of the optical resonator assembly illustrated in FIG. 3, including a graph of a received signal and graphs of output intensity, according to various examples described herein.

As discussed above, in various examples each optical resonator 310, 312, 314 of the optical resonator assembly 302 may include a pair of semi-reflective surfaces that trap resonant optical signal energy. FIG. 4 illustrates an example of the optical resonator assembly 302 illustrated in FIG. 3, and in particular, shows optical signal energy resonating between the first-semi reflective surface 318a, 318, 318c and the second semi-reflective surface 320a, 320b, 320c of each optical resonator 310, 312, 314. Each optical resonator 310, 312, 314 may coherently develop output optical signal energy based on a received optical signal (e.g., optical signal 308) when the received optical signal is at a corresponding frequency, and maintain a given level of the output optical signal energy (e.g., output optical signal energy 316) until a frequency variation (e.g., a modulation in frequency) of the received optical signal occurs.

Figure 5:
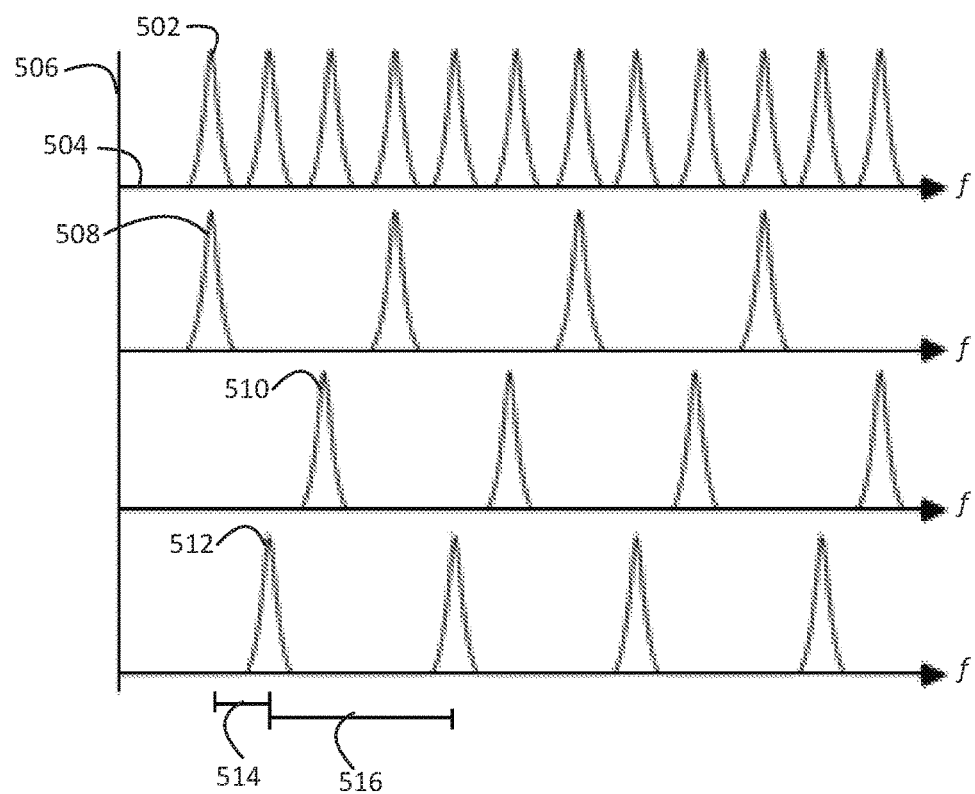
FIG. 5 is a graph of transmission bands for each of the plurality of optical resonators illustrated in FIG. 3, relative to a frequency of a received signal, according to various examples described herein.

When a frequency variation (e.g., frequency modulation) occurs in the received optical signal, destructive interference inside the resonant optical resonator causes a frequency-dependent change in the intensity (e.g., a decrease) of the corresponding output optical signal energy. At the same time, the received optical signal may accumulate or add to build up resonating optical signal energy in another of the optical resonators 310, 312, 314 and cause a frequency-dependent change in the intensity (e.g., an increase) of the corresponding output optical signal energy of that optical resonator. This can be seen in the input plot 402 and the output power plots 404a, 404b, 404c illustrated in FIG. 4. In particular, FIG. 4 illustrates output power plots 404a, 404b, 404c of the intensity (as output power) emerging from each of the optical resonators 310, 312, 314 during a first frequency variation and a second frequency variation in the input optical signal 308. Output power plot 404a represents the intensity (as output power) emerging from the first optical resonator 310, output power plot 404b represents the intensity (as output power) emerging from the second optical resonator 312, and output power plot 404c represents the intensity (as output power) emerging from the third optical resonator 314. In the illustrated input plot 402 of the optical signal 308, a first frequency variation occurs at point 406 between a first frequency, f1, and a second frequency, f2. A second frequency variation occurs at point 408 between the second frequency, f2, and a third frequency, f3. While FIG. 4 illustrates at least one of the optical resonators 310, 312, 314 providing output optical signal energy for any given frequency of the received optical signal 308, in practice, each of the optical resonators 310, 312, 314 may actually have a narrow bandwidth. Therefore, in some examples, during the operation of the optical resonators 310, 312, 314 there may be moments in time when the corresponding OECs do not register any output optical signal energy. FIG. 5, which is described in further detail below, illustrates one such example.

Referring to FIG. 4, at point 410, when the optical signal 306 is arriving at the first frequency, f1, the optical resonator 310 is in a steady-state resonance condition during which a steady intensity of output optical signal energy emerges. For instance, this may be the case when the characteristic resonant frequency of the first optical resonator 310 is aligned with the frequency of the received optical signal 308. At point 410, the optical resonators 312, 314 interact with the received optical signal 308 in a different manner. In particular, while the first optical resonator 310 is tuned to the frequency of the received optical signal (e.g., an optical length of the first optical resonator 310 is an integer multiple of half-wavelengths, for example), each of the other optical resonators 312, 314 is slightly off-tune to the wavelength. Accordingly, the arriving optical signal 308 may not achieve resonance in the second and third optical resonators 312, 314. While the arriving optical signal 308 may not achieve resonance in the second and third optical resonators 312, 314, the second and third optical resonators 312, 314 may nevertheless emit low intensity output optical signal energy. As illustrated by a comparison of the output power plots 404a, 404b, 404c at point 410, the output optical signal intensity is greater for the resonating optical resonator (i.e.,
the first optical resonator 310 in this example) relative to the other optical resonators 312, 314.

At point 406, a frequency variation occurs in the arriving optical signal 308. In the input power plot 402, the optical signal 308 is shown as transitioning between the first frequency, f1, and the second frequency, f2. The frequency variation disrupts the steady-state of the first optical resonator 310 and causes a change in the emerging light intensity of the output optical signal energy of the first optical resonator 310. As shown in the output power plot 404a corresponding to the output optical signal energy of the first optical resonator 310, the change in the emerging light intensity of the output optical signal energy may be a decrease in amplitude. At the same time, during successive reflections inside another of the optical resonators, for instance the second optical resonator 312, labeled at point 412, resonance is established and the emerging light intensity of the output optical signal energy increases until, at point 414, a steady intensity of light emerges when the optical resonator 312 has reached a steady-state condition. For instance, this may be the case when the characteristic resonant frequency of the second optical resonator 312 is tuned to the second frequency of the received optical signal 308. At point 414, the third optical resonator 314 is still slightly off-tune to the frequency of the optical signal 308, and therefore, operates in a manner similar to that at point 410.

At point 408, another frequency variation occurs in the arriving optical signal 308. In the input power plot, the optical signal 308 is shown as transitioning between the second frequency, f2, and the third frequency, f3. The frequency transition disrupts the steady-state of the second optical resonator 312 and causes a change in the emerging light intensity of the output optical signal energy thereof. As shown in the output power plot 404b corresponding to the output optical signal energy of the second optical resonator 312, the change in the emerging light intensity of the output optical signal energy may be a decrease in amplitude. At the same time, during successive reflections inside another of the optical resonators, for instance the third optical resonator 312, labeled at point 416, resonance is established and the emerging light intensity of the output optical signal energy increases until, at point 418, a steady intensity of light emerges when the third optical resonator 314 has reached a steady-state condition. For instance, this may be the case when the characteristic resonant frequency of the third optical resonator 314 is tuned to the third frequency of the received optical signal 308. At point 418, the first optical resonator 310 is still slightly off-tune to the frequency of the optical signal 308, and therefore, operates in a manner similar to that at point 414.

Accordingly, a variation (e.g., disruption) in the emerging light intensity of the output optical signal energy from at least one of the plurality of optical resonators 310, 312, 314 indicates that a variation occurred in the arriving optical signal 310. In many examples, this variation may be a variation in a frequency of the received optical signal. As such, the disruption in the output optical signal energy (e.g., output optical signal energy 316 in FIG. 3) may be used by appropriate signal processing components to determine useful information by analyzing the emerging light intensity of the output optical signal energy. In the example discussed above and illustrated by FIG. 4, the arriving optical signal 308 is presumed to be frequency modulated, but other examples include phase or amplitude modulation, or any combination of these, and may cause similar variations or other detectable variations in output intensity. In some examples, higher order or more complex modulation may be accommodated by various optical resonator designs.

Referring to FIG. 5, illustrated is a plot of an optical signal 502 as received at each of the optical resonators 310, 312, 314 illustrated in FIGS. 3 and 4. In FIG. 5, the optical signal 502 has a continuously increasing frequency plotted along horizontal axis 504. The vertical axis 506 represents an intensity level, which for the optical signal 502 is an arbitrary intensity. FIG. 5 further illustrates the transmission bands for each of the optical resonators 310, 312, 314 relative to the received optical signal 502 and plotted along the same horizontal axis 504. In particular, a first plot 508 is representative of the output optical signal energy of the first optical resonator 310, a second plot 510 is representative of the output optical signal energy of the second optical resonator, and a third plot 512 is representative of the output optical signal energy of the third optical resonator 314.

As discussed, in various examples, a total difference in optical length between the first optical resonator 310 and a last optical resonator (e.g., third optical resonator 314 shown in FIG. 3) of the optical resonator assembly 302 is slightly less than $\lambda/2$. Accordingly, each optical resonator 310, 312, 314 may have additional transmission bands that are integer multiples of half-wavelengths of the respective characteristic wavelength of that optical resonator. As illustrated in FIG. 5, the difference in optical length between each of the optical resonators 310, 312, 314 may be selected such that at least one of the optical resonators 310, 312, 314 resonates and emits output optical signal energy for any given frequency of the received optical signal 308. In particular, the increment (shown as increment 514) between each transmission band of the plurality of optical resonators 310, 312, 314 may be represented as:

$$\text{increment} = \frac{c}{2 \cdot m \cdot d \cdot n},$$

where "c" represents the speed of light, "m" is the total number of optical resonators within the optical resonator assembly 302, "d" is the physical length of the first optical resonator 310, and "n" represents the index of refraction. In such an example, (d·n) represents the optical length of that optical resonator. Accordingly, for the illustrated example, the increment 514 is:

$$\frac{c}{6 \cdot d \cdot n}.$$

In such an example, the particular gap (shown as gap 516) between each transmission band of a particular optical resonator may be represented as:

$$\frac{c}{2 \cdot d \cdot n}.$$

Referring again to FIG. 3, the output optical signal energy 316 of each optical resonator 310, 312, 314 may be converted to an electrical signal by a detector assembly 304. In particular, the detector assembly 304 may include a plurality of OECs (e.g., OECs 328a, 328b, 328c shown in FIG. 3), one for each optical resonator of the optical resonator assembly 302. Each output optical signal may be focused to varying extent by various optics (e.g., lenses 330a, 330b, 330c), in some examples, to provide a focused output optical signal. In other examples, the output optical signal energy 316 may not be focused. Either of the output optical signal 316 or the focused output optical signals may be provided to the corresponding OEC 328a, 328b, 328c, which may be a photodetector, such as a photodiode, as discussed previously, to convert the output optical signal energy 316 into an electrical signal. In various examples, the output optical signal energy 316 may further be converted to a digital format. In various other examples, the optical receiver 300 may include additional optical components and/or OECs to accommodate other types of encoded optical signals. For instance, in an example in which the optical signal 308 includes information encoded within a polarization thereof, the optical receiver 300 may include polarizers and/or reflectors positioned proximate OECs 328a, 328b, 328c, as well as, additional OECs to receive light of an orthogonal polarization.

In various examples, the electrical signals produced by the OECs 328a, 328b, 328c may have corresponding amplitude variations representative of the intensity variations of the output optical signal energy 316, and moreover, the frequency modulation of the received optical signal 308. As described, each optical resonator 310, 312, 314 causes the received optical signal 308 to resonantly interact with itself when received at a frequency aligned with a characteristic resonant frequency of that optical resonator 310, 312, 314. Frequency changes in the received optical signal 308 disrupt the resonance of optical signal energy within that optical resonator 310, 312, 314 and cause amplitude (or intensity) variations in the output optical signal energy 316, which may be coupled directly to the corresponding OEC 328a, 328b, 328c and other components of a detector.

In various examples, each OEC 328a, 328b, 328c is coupled to the signal processing circuit 306, which may include one or more hardware or software components that convert the electrical signal(s) to a digital signal. In particular, the signal processing circuit 306 may include a logic component 332 that is coupled to a counter 334. While in one example the logic component 332 is a hardware component formed from one or more logic gates (e.g., implemented using switches, transistors, and/or diodes) that operate in concert with the counter 334 to generate the digital signal, in various other examples, the logic component 332 may include one or more microprocessors executing a set of software instructions, or may include an application-specific integrated circuit (ASIC), to name a few examples. Similarly, the counter 334 may include a digital counter implemented using an integrated circuit.

In various examples, the signal processing circuit 306 can track the changes in output intensity and thereby recover the information content of the received modulated optical signal. The logic component 332 may apply a set of logic rules to the received electrical signal(s) to detect variations in the frequency of the received optical signal 308, and differentiate between increases in frequency and decreases in frequency. In particular, the logic component 332 may correlate a variation in the output optical signal energy 316 of at least two of the optical resonators 310, 312, 314 to an increase or a decrease in frequency. The particular optical resonator that has increased (or is increasing) in output, relative to the particular optical resonator that has decreased (or is decreasing) in output, evidences whether the variation in frequency is an increase or a decrease. In various examples, the logic rules drive the counter 334 to increase or decrease a count to generate the digital signal. For instance, in one example the logic component 332 may implement a set of logic rules according to the logic matrix described in Table 1 below.

TABLE 1

| | | Decrease in Output Optical Signal Energy | | |
|---|---|---|---|---|
| | | Detector 328a | Detector 328b | Detector 328c |
| Increase in Output Optical Signal Energy | Detector 328a | 0 | −1 | 1 |
| | Detector 328b | 1 | 0 | −1 |
| | Detector 328c | −1 | 1 | 0 |

Referring to Table 1, each row corresponds to an optical detector 328a, 328b, 328c of the detector assembly 304, and each column also corresponds to an optical detector 328a, 328b, 328c of the detector assembly 304. At any given moment during the operation of the optical signal receiver 300, by mapping the particular optical resonator that is increasing or has increased in output optical signal energy, and the particular optical resonator that is decreasing or has decreased in output optical signal energy, the logic component 332 may communicate with the counter 324 to increase or decrease the count. For instance, if the output optical signal energy of the second detector 328b has decreased or is decreasing (e.g., designated by the third column), and the output optical signal energy of the first detector 328a has increased or is increasing (e.g., designated by the second row) the count may be adjusted by −1. However, if the output optical signal energy of the second detector 328b has increased or is increasing (e.g., designated by the third row), and the output optical signal energy of the first detector 328a has decreased or is decreasing (e.g., designated by the second column), the count may be adjusted by +1. If no change occurs in the output optical signal energy of the second detector 328b, no adjustment is made to the count (e.g., shown as a 0 in Table 1). This set of logic rules may be applied to any combination of output optical signal energies of the optical resonator assembly 302.

While in the described examples, the optical resonator assembly 302 is described as including three optical resonators 310, 312, 314, in various other examples, the optical resonator assembly 302 is not so limited. For instance, as the number of optical resonators within the assembly 302 increases, the resolution of the optical signal receiver 300 may increase. This is the case because, as discussed above, the wavelength increment between each transmission band of the plurality of optical resonators 310, 312, 314 may be represented as:

$$\text{wavelength increment} = \frac{c}{(2 \cdot m \cdot d \cdot n)}.$$

Accordingly, as more optical resonators are added to the optical resonator assembly 302, the wavelength increment between each transmission band of the optical resonators within the assembly 302 decreases. In various examples, the rule matrix of Table 1 may be expanded to accommodate optical resonator assemblies that include more than three optical resonators. In one example, the logic component may implement a set of logic rules according to the logic matrix described in Table 2 below.

TABLE 2

| | | Decrease in Output Optical Signal Energy | | | | | |
|---|---|---|---|---|---|---|---|
| | | D1 | D2 | D3 | D4 | ... | Dm |
| Increase in Output Optical Signal Energy | D1 | 0 | −1 | | | | 1 |
| | D2 | 1 | 0 | −1 | | | |
| | D3 | | 1 | 0 | −1 | | |
| | D4 | | | 1 | 0 | ... | |
| | D5 | | | | 1 | ... | −1 |
| | Dm | −1 | | | | ... | 0 |

Similar to Table 1, in Table 2 each row corresponds to an optical detector of the associated detector assembly, and each column also corresponds to an optical detector of the detector assembly. Specifically, in Table 2, the optical detector assembly may include, "m" number of detectors. By mapping the particular optical resonator that is increasing or has increased in output optical signal energy, and the particular optical resonator that is decreasing or has decreased in output optical signal energy, the logic component 332 may communicate with the counter 334 to increase or decrease the count. While Table 1 and Table 2 illustrate two particular examples of logic rules that may be used by the logic component 332 and counter 334 to generate a digital signal, it is appreciated that in various other examples other suitable techniques may be used.

Figure 6:
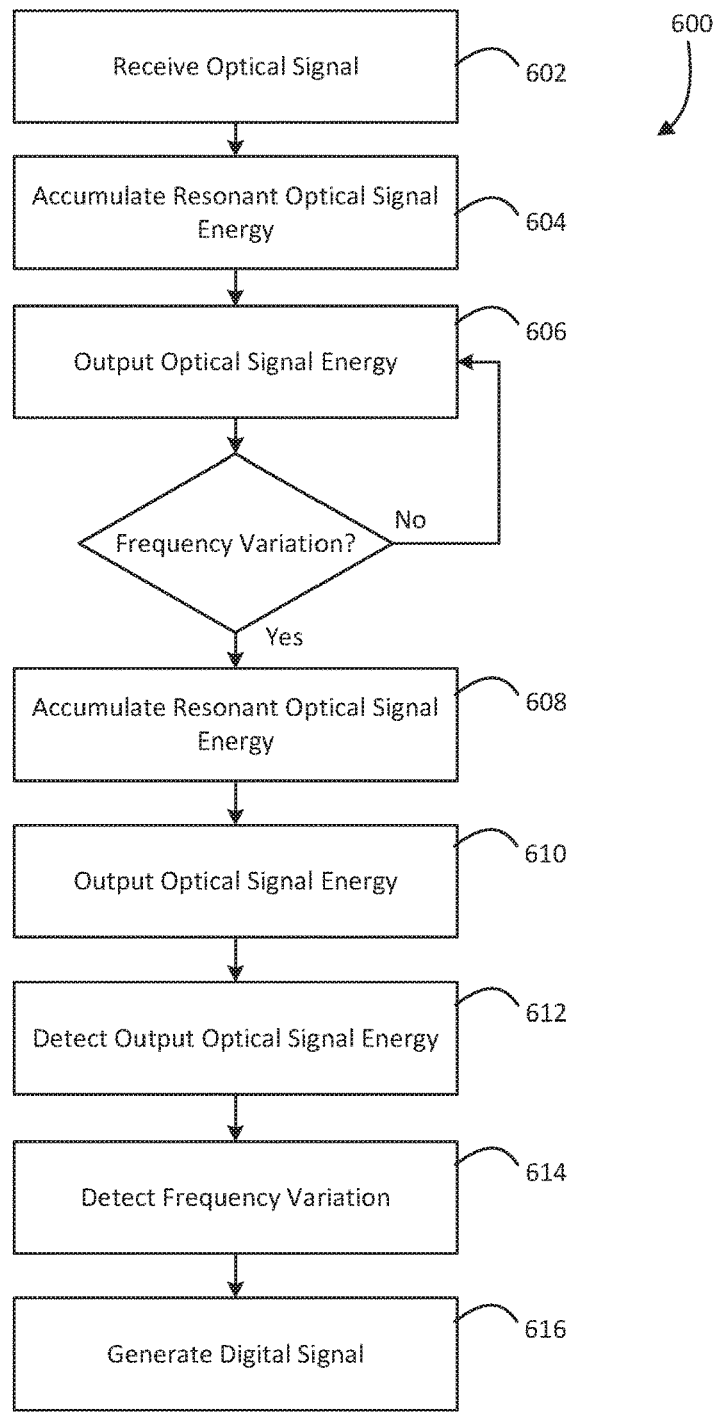
FIG. 6 is a process flow of a method for operating an optical signal receiver, according to various examples described herein.

As discussed above, various examples perform processes that improve known techniques for detecting and demodulating a frequency-encoded optical signal. In some examples, these processes are executed by an optical receiver, such as the optical receiver 200 described above with reference to FIG. 2. In particular examples, the optical receiver may include an optical resonator assembly, such as the optical resonator 302 described with reference to FIG. 3. One example of a process for operating an optical receiver, such as the optical receiver illustrated in FIG. 2, is illustrated in FIG. 6. FIG. 6 is described with continuing reference to the optical receiver 300 illustrated in FIG. 3. In various examples, the process 600 may include receiving an optical signal, accumulating resonant optical signal energy at a first optical resonator, and outputting (e.g., transmitting or reflecting) output optical signal energy from the first optical resonator. In response to a variation in a frequency of the received optical signal, the process 600 may include accumulating resonant optical signal energy at a second optical resonator, outputting (e.g., transmitting or reflecting) output optical signal energy from the second optical resonator, detecting the first output optical signal energy and the second output optical signal energy, detecting the variation in the frequency of the optical signal, and generating a digital signal.

In act 602, the process 600 may include receiving an optical signal at each of the plurality of optical resonators 310, 312, 314 of the optical resonator assembly 302. For instance, the optical receiver 300 may receive an optical signal transmitted along a free space signal path (e.g., free space optical, FSO), a fiber coupling, or another waveguide system by the optical transmitter 100 of FIG. 1. In act 604, the process 600 may include accumulating resonant optical signal energy within a first optical resonator of the optical resonator assembly 302. That is, in various examples, the arriving optical signal allowed into the optical resonator assembly 302 (i.e., between the pair of semi-reflective surfaces of each optical resonator 310, 312, 314) may add or build-up to resonate inside a first optical resonator (e.g., first optical resonator 310). As such, in act 604 the optical signal received by the first optical resonator 310 may establish a steady-state energy-preserving condition in which an optical signal continuously arrives at the first optical resonator 310 and accumulates or adds to build-up resonating optical signal energy inside the first optical resonator 310.

In act 606, the process 600 may include outputting (e.g., transmitting or reflecting) first output optical signal energy from the first optical resonator 310 during the resonance of the first optical resonator 310. In particular, an intensity of the output optical signal energy may be based at least in part on an intensity of the accumulated resonant optical signal energy. That is, in various examples, at least a portion of the accumulated resonating optical signal energy inside the first optical resonator 310 may be emitted from the first optical resonator 310 at a constant rate (i.e., a steady-state output value). A variation in the frequency of the optical signal may disrupt the optical signal energy resonating inside the first optical resonator 310, and, accordingly, disturb the first output optical signal energy.

As described herein, a change in frequency of the arriving optical signal may disrupt the resonating optical signal energy of the first optical resonator 310. Accordingly, in response to a variation in a frequency of the received optical signal, the process 600 may include accumulating resonant optical signal energy within a second optical resonator of the optical resonator assembly 302. That is, in various examples, the arriving optical signal allowed into the optical resonator assembly 302 may add or build-up to resonate inside a second optical resonator (e.g., the second optical resonator 312) following a variation in frequency (act 608). As such, in act 608 the optical signal received by the second optical resonator 312 may establish a steady-state energy-preserving condition in which the optical signal continuously arrives at the second optical resonator 312 and accumulates or adds to build-up resonating optical signal energy inside the second optical resonator 312. In act 610, the process 600 includes outputting (e.g., transmitting or reflecting) second output optical signal energy from the second optical resonator 312 during the resonance of the second optical resonator 312.

In act 612, the process 600 may include detecting the first output optical signal energy and the second output optical signal energy at a detector assembly aligned with the plurality of optical resonators 310, 312, 314 of the optical resonator assembly 302. Such actions may be performed by a detector assembly, such as a detector assembly 304 that includes the plurality of OECs 328a, 328b, 328c shown in FIG. 3. In acts 614 and 616 the process 600 may include detecting the variation in the frequency of the received optical signal based on the first output optical signal energy and the second output optical signal energy, and generating a digital signal based on the detected variation in the frequency of the received optical signal.

During acts 614 and 616 logic component 332 may apply a set of logic rules to detect the variation in frequency of the received optical signal, and determine if the variation is an increase in frequency or a decrease in frequency. In particular, the logic component 332 may correlate a variation in the output optical signal energies of at least the first optical resonator 310 and the second optical resonator 312 to an increase or a decrease in frequency. The particular optical resonator that is increasing or has increased in output, relative to the particular optical resonator that is decreasing or has decreased in output, evidences whether the variation in frequency is an increase or a decrease. In various examples, the logic rules drive the counter 334 to increase or decrease a count to generate the digital signal. For instance, in one example the logic component 332 may implement a set of logic rules according to the logic matrix previously described with reference to Table 1.

While not explicitly illustrated or described with reference to the process flow illustrated in FIG. 6, in various examples the process 600 may include additional acts or sub-acts. Such acts and sub-acts are described herein with reference to at least FIGS. 2, 3, 4, and 5.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

As discussed above with reference to at least FIGS. 1 and 2, in various examples components of the optical transmitter 100, and/or optical receiver 200, and/or optical receiver 300 may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 7:
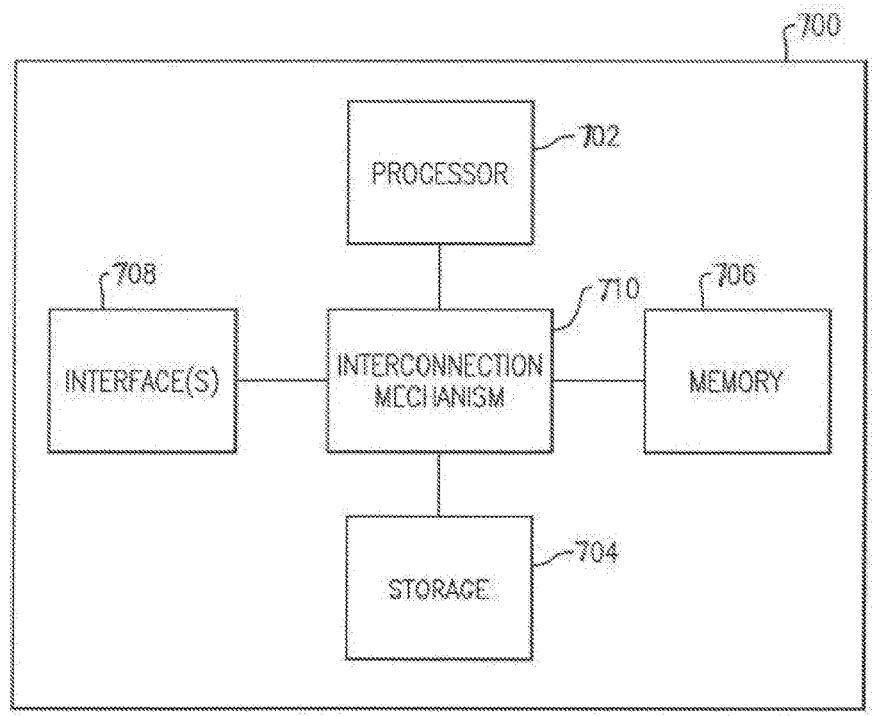
FIG. 7 is a functional block diagram of an example of a computing system that may be configured to implement various examples of the processes described herein.

FIG. 7 illustrates one example of a computing system 700 that may implement software routines corresponding to a control circuit or module, the FEC module 104, the spreading module 106, the mapping module 108, as illustrated in FIG. 1, and/or other components. The computing system 700 may further implement software routines corresponding to the components associated with the digital processing subsystem 250 of FIG. 2 and/or other components of a receiver 200. The computing system 700 may include a processor 702, data storage 704, a memory 706, and one or more interfaces 708, such as a system interface and/or a user interface. While not explicitly illustrated in FIG. 7, in certain examples the computing system 700 may be coupled to a power source. The power source may deliver power to one or more components of the computing system 700, as well as other components of the optical transmitter 100 or optical receiver 200.

In FIG. 7, the processor 702 is coupled to the data storage 704, memory 706, and the various interfaces 708. The memory 706 stores programs (e.g., sequences of instructions coded to be executable by the processor 702) and data during operation of the computing system 700. Thus, the memory 706 may be a relatively high performance, volatile, random access memory such as a dynamic random access memory ("DRAM") or static memory ("SRAM"). However, the memory 706 may include any device for storing data, such as a disk drive or other nonvolatile storage device. Various examples may organize the memory 706 into particularized and, in some cases, unique structures to perform the functions disclosed herein. These data structures may be sized and organized to store values for particular data and types of data.

The data storage 704 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 702 to perform any of the functions described herein.

In various examples, the computing system 700 includes several interface components 708, such as a system interface and/or a user interface. Each of the interface components 708 is configured to exchange, e.g., send or receive, data with other components of the computing system 700 (and/or associated transmitter or receiver), or other devices in communication with the computing system 700. According to various examples, the interface components 708 may include hardware components, software components, or a combination of hardware and software components.

In certain examples, components of the system interface couples the processor 702 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the computing system 700 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 700. Data received at the various interfaces may be provided to the processor 702, as illustrated in FIG. 7. Communication coupling (e.g., shown interconnection mechanism 710) between the processor 702, memory 706, data storage 704, and interface(s) 708 may be implemented as one or more physical busses in conformance with standard, proprietary, or specialized computing bus technologies.

The processor 702 performs a series of instructions that result in manipulated data that is stored in and retrieved from the data storage 704, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 702 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 702 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
an optical resonator assembly configured to receive an optical signal at each of a plurality of optical resonators, each optical resonator of the plurality of optical resonators being configured to resonate optical signal energy at a corresponding frequency of the received optical signal, each optical resonator of the plurality of optical resonators being tuned to a different corresponding frequency of the received optical signal relative to other optical resonators of the plurality of optical resonators, wherein each optical resonator of the plurality of optical resonators is further configured to output a corresponding output optical signal energy during the resonance thereof, the plurality of optical resonators including a first optical resonator and a second optical resonator;
a detector assembly aligned with an output of each of the plurality of optical resonators to detect the corresponding output optical signal energy from each of the plurality of optical resonators; and
a signal processing circuit coupled to the detector assembly and configured detect a frequency variation of the received optical signal based on an increase in the corresponding output optical signal energy from the first optical and a decrease in the corresponding output optical signal energy from the second optical resonator, and configured to generate a digital signal based on the detected frequency variation, wherein the signal processing circuit includes a counter, and the counter is configured to increase or decrease a count to generate the digital signal based on the frequency variation of the received optical signal.

2. The optical signal receiver of claim 1, wherein the plurality of optical resonators further includes a third optical resonator, the counter being configured to increase the count responsive to the increase in the corresponding output optical signal energy from the first optical resonator and the decrease in the corresponding output optical signal energy from the second optical resonator, and decrease the count responsive to an increase in the corresponding output optical signal energy from the third optical resonator and the decrease in the corresponding output optical signal energy from the second optical resonator.

3. The optical signal receiver of claim 1, wherein each optical resonator of the plurality of optical resonators has a corresponding optical length, the corresponding optical length of each optical resonator being different than the corresponding optical length of the other optical resonators of the plurality of optical resonators.

4. The optical signal receiver of claim 3, wherein the optical resonator assembly further includes a third optical resonator, and wherein the optical resonator assembly has a fixed step spacing between the corresponding optical lengths of the first optical resonator and the second optical resonator, and the corresponding optical lengths of the second optical resonator and the third optical resonator.

5. The optical signal receiver of claim 1, wherein each optical resonator of the plurality of optical resonators is an etalon having a pair of semi-reflective surfaces configured to at least partially trap the optical signal energy between the pair of semi-reflective surfaces by reflecting a portion of optical signal energy between pair of semi-reflective surfaces.

6. The optical signal receiver of claim 1, wherein the frequency variation of the received optical signal corresponds to a frequency modulation of the received optical signal.

7. A method of detecting information encoded in an optical signal, the method comprising:
receiving the optical signal at each of a plurality of optical resonators;
within a first optical resonator of the plurality of optical resonators, resonating optical signal energy at a first frequency of the received optical signal, and outputting first output optical signal energy from the first optical resonator during a resonance of the first optical resonator;
responsive to a frequency variation of the received optical signal, within a second optical resonator of the plurality of optical resonators, resonating optical signal energy at a second frequency of the received optical signal, and outputting second output optical signal energy from the second optical resonator during a resonance of the second optical resonator;
detecting the first output optical signal energy and the second output optical signal energy at a detector assembly aligned with the plurality of optical resonators;
disrupting the resonance and the first output optical signal energy of the first optical resonator responsive to the frequency variation of the received optical signal;
detecting the frequency variation of the received optical signal based on a decrease in the first output optical signal energy from the first optical resonator and an increase in the second output optical signal energy from the second optical resonator; and
generating a digital signal based on the detected frequency variation of the received optical signal, wherein generating the digital signal includes increasing or decreasing a count.

8. The method of claim 7, further comprising responsive to another frequency variation in the received optical signal, within a third optical resonator of the plurality of optical resonators, resonating optical signal energy at a third frequency of the received optical signal, and outputting third output optical signal energy from the third optical resonator, each of the first, the second, and the third frequency of the received optical signal being different.

9. The method of claim 8, wherein generating the digital signal includes increasing the count responsive to an increase in the first output optical signal energy and a decrease in one of the second output optical signal energy and the third output optical signal energy, and wherein generating the digital signal further includes decreasing the count responsive to an increase in the first output optical signal energy and a decrease in another of the second output optical signal energy and the third output optical signal energy.

10. The method of claim 7, wherein resonating optical signal energy within the first optical resonator includes reflecting a first portion of the received optical signal energy between a first pair of semi-reflective surfaces, and resonating optical signal energy within the second optical resonator includes reflecting a second portion of the received optical signal energy between a second pair of semi-reflective surfaces.

11. The method of claim 7, wherein the frequency variation of the received optical signal corresponds to a frequency modulation of the received optical signal.

12. An optical signal receiver comprising:
a first optical resonator positioned to receive an optical signal, the first optical resonator being configured to resonate optical signal energy at a first frequency of the received optical signal, and configured to output first output optical signal energy during the resonance of the first optical resonator;
a second optical resonator positioned to receive the optical signal, the second optical resonator being configured to resonate optical signal energy at a second frequency of the received optical signal, and configured to output second output optical signal energy during the resonance of the second optical resonator;
a third optical resonator positioned to receive the optical signal, the third optical resonator being configured to resonate optical signal energy at a third frequency of the received optical signal, and configured output third output optical signal energy during the resonance of the third optical resonator, wherein each of the first frequency, the second frequency, and the third frequency are different;
a detector assembly positioned to detect the first output optical signal energy, the second output optical signal energy, and the third output optical signal energy; and
a signal processing circuit coupled to the detector assembly and configured detect a frequency variation of the received optical signal based on an increase in the first output optical signal energy, the second output optical signal energy, or the third output optical signal energy, and a decrease in another of the first output optical signal energy, the second output optical signal energy, and the third output optical signal energy, the signal processing circuit being including a counter configured to increase or decrease a count to generate a digital signal based on the detected frequency variation of the received optical signal.

13. The optical signal receiver of claim 12, wherein each of the first optical resonator, the second optical resonator, and the third optical resonator is an etalon having a pair of semi-reflective surfaces.

* * * * *

UNITED STATES PATENT AND TRADEMARK OFFICE
CERTIFICATE OF CORRECTION

PATENT NO. : 10,243,673 B2
APPLICATION NO. : 15/816670
DATED : March 26, 2019
INVENTOR(S) : Benjamin P. Dolgin et al.

Page 1 of 1

It is certified that error appears in the above-identified patent and that said Letters Patent is hereby corrected as shown below:

In the Claims

Column 24, Line 34, delete ":" and insert -- ; --.

Column 24, Line 43, delete "first optical and a decrease" and insert -- first optical resonator and a decrease --.

Signed and Sealed this
Twenty-eighth Day of May, 2019

Andrei Iancu
*Director of the United States Patent and Trademark Office*